Aug. 4, 1925.

H. C. CLYMER

DIRIGIBLE AUTOMOBILE HEADLIGHT

Filed Nov. 14, 1923

1,548,256

Inventor

Harrison C. Clymer.

By Jaerli & Jaerli

Attorneys

Patented Aug. 4, 1925.

1,548,256

UNITED STATES PATENT OFFICE.

HARRISON C. CLYMER, OF TIOSA, INDIANA.

DIRIGIBLE AUTOMOBILE HEADLIGHT.

Application filed November 14, 1923. Serial No. 674,655.

*To all whom it may concern:*

Be it known that HARRISON C. CLYMER, a citizen of the United States, residing at Tiosa, in the county of Fulton and State of Indiana, has invented certain new and useful Improvements in Dirigible Automobile Headlights, of which the following is a specification.

My invention relates to dirigible automobile headlights and its principal object is to provide a dirigible headlight embodying a bracket or attachment to be operatively connected with the steering gear of the automobile so that upon operation of the latter the light will be operated simultaneously to throw its light rays directly in the path of the automobile.

A further object of the invention is to provide a light attachment for automobiles which will adapt itself to any conventional make of automobile and can be purchased and applied to the automobile at a nominal cost.

It is also an object of the present invention to provide a dirigible automatic headlight which is of comparative simple construction and which when attached to the automobile is not likely to become out of order and of such construction as to have all of its parts within the reach of the operator thus enabling him to make adjustments with comparative ease and facility.

With the preceding and other objects and advantages in mind the invention consists in the novel combination of elements, constructions and arrangement of parts and operations to be hereinafter specifically referred to, claimed and illustrated on the accompanying drawing, wherein Figure 1 is a front elevation of an automobile embodying my headlight.

Figure 1:
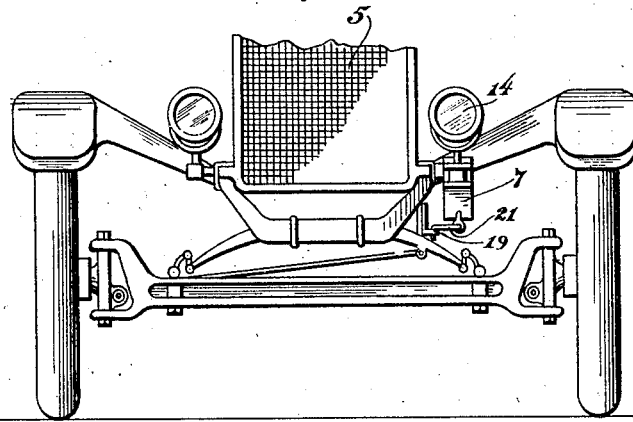
Figure 2:
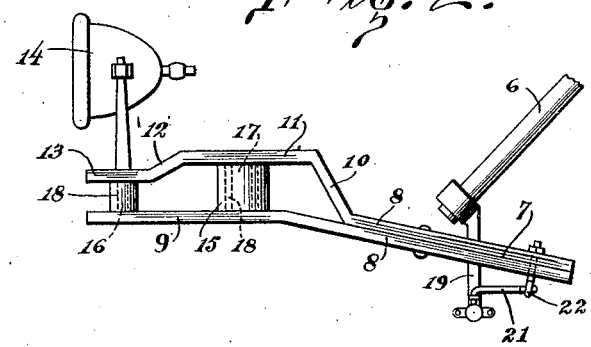
Figure 2 is an enlarged elevation of the device associated with the steering post of the automobile steering mechanism.
Figure 3:
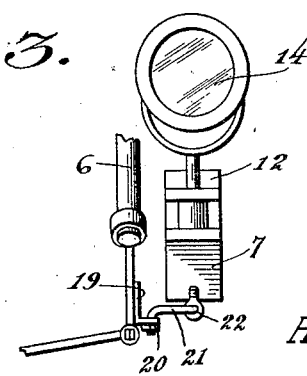
Figure 3 is an enlarged fragmentary elevation showing the connection between the steering post and bracket.

Referring in detail to the drawing wherein corresponding characters of reference denote corresponding parts throughout the several views the numeral 5 designates a conventional automobile having the usual steering post 6. The steering post of the automobile is of conventional construction and a further description of the same is unnecessary.

My attachment reduced to practice comprises a bracket indicated generically at 7 and includes longitudinal bars 8 arranged in opposed relation, and extended at an oblique angle with respect to the horizontal and the bottom one of which being bent to extend substantially horizontal as indicated at 9. The uppermost bar is bent at an oblique angle with respect to the vertical as indicated at 10 and thence bent at right angles as designated at 11 to extend parallel to the part 9. The end of the part 11 is bent downwardly at an angle as at 12 extended horizontally as indicated at 13 to constitute a lamp base to which a conventional lamp 14 is attached. The horizontal parts 9 and 11 are disposed upon opposite sides of part of the automobile on the frame designated at 15 and through which a pivot pin 16 extends. A vertical pin 17 connects the ends of the parts 9 and 11 and disposed on this pin and the pivot pin 16 are bushings 18 to space these parts. Fixed to the lower end of the steering post 6 is an angle bracket 19 and horizontally of this bracket is pivotally connected the threaded end 20, of an arm 21. This bracket is connected by means of opposed nuts threaded on this part 20. The opposite end of the arm 21 is provided with a universal joint 22 carried by the free end of the bracket 7.

From the disclosed it will be seen that upon rotation of the steering post 6 a bracket 7 will be swung on its axis to cause the light 14 to project its rays direct in the path of the automobile at all times.

From the foregoing it will be seen that I have provided a simple, inexpensive and efficient means for carrying out the objects of the invention, and while I have particularly described the means best adapted to perform the functions set forth, various changes in form, proportion and in the minor details of construction may be resorted to without departing from the spirit or sacrificing any of the principles of the invention.

What I claim as new and desire to protect by Letters Patent is:—

In a dirigible headlight for automobiles, the combination with an automobile frame; of a bracket comprising a pair of bars, portions of the same being secured in contact one with the other and disposed obliquely from their inner toward their outer ends, the outer portion of the lowermost bar of the bracket extending horizontally and disposed in contact with the under face of the automobile frame, the upper bar from the oblique contacting portion extending upwardly at an angle and thence horizontally parallel to the horizontal portion of the lowermost bar, the outer end portion of the last mentioned parallel portion of the uppermost bar being thence bent downwardly and upwardly in parallel relation to the horizontal portion of the lowermost bar, the extreme outer end of the last mentioned parallel portion being in contact with the upper face of said automobile frame, means extending through the frame and outer end portions of the bars of said bracket to pivotally support the latter on the frame, spacing members between the horizontal parallel portions of the bars of the bracket rearward of said frame a lamp mounted on the upper bar of the bracket at the forward end of the latter, a steering post for the automobile, an angle bracket secured to the lower end of said post and means connecting said angle bracket with the inner end of said first mentioned bracket to actuate the latter on its pivot upon the operation of said steering post, as and for the purposes described.

In testimony whereof I affix my signature.

HARRISON C. CLYMER.